Figure 1:
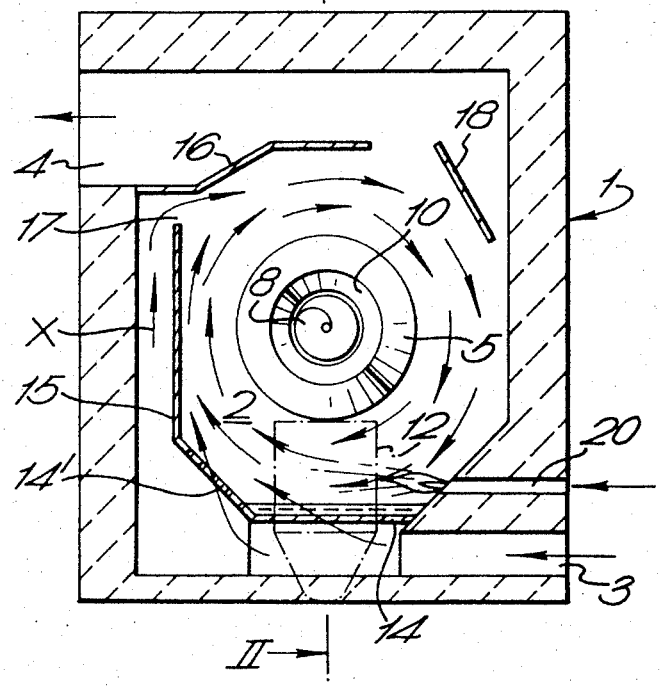

United States Patent [19]
Hibbert

[11] 3,745,940
[45] July 17, 1973

[54] FLUIDISED BED APPARATUS AND METHOD

[75] Inventor: Sydney George Hibbert, Durham, England

[73] Assignee: Sprocket Properties Limited, Durham, England

[22] Filed: Dec. 6, 1971

[21] Appl. No.: 205,167

[30] Foreign Application Priority Data
Dec. 7, 1970  Great Britain ............... 57,928/70

[52] U.S. Cl. ........................... 110/8 R, 110/28 J
[51] Int. Cl. ........................................ F23g 5/00
[58] Field of Search ............... 122/4 D; 110/8 R, 110/28 J

[56] References Cited
UNITED STATES PATENTS
2,818,049  12/1957  Blaskowski et al. ............... 122/4
3,397,657  8/1968  Tada ............................... 110/28
3,596,614  8/1971  Smith et al. ..................... 110/28
3,625,165  12/1971  Ishigaki .......................... 110/28

*Primary Examiner* — Kenneth W. Sprague
*Attorney* — Donald M. Wight, Charles E. Brown et al.

[57] ABSTRACT

Fluidised bed apparatus is described in which the fluidising gas is admitted so as to set up a recirculation of solid matter in a chamber through successive zone in which the material is successively unfluidised, fluidised, suspended, and finally recirculated by a secondary air stream across the top of the unfluidised zone. An embodiment of the apparatus as a refuse incinerator is described, comminuted refuse being fed into the bed material within the apparatus.

8 Claims, 3 Drawing Figures

FLUIDISED BED APPARATUS AND METHOD

This invention relates to fluidised bed apparatus, and more especially although not exclusively to fluidised bed furnaces and heat treatment apparatus.

Fluidised beds are known to be particularly useful where a particulate solid is required to be brought into intimate contact with a gas for any of a wide range of purposes. Thus the gas may be merely a heat transfer medium (as well of course as a fluidising medium) or may be required to react in some way with the bed material or a further material introduced into the bed or the bed material may catalyse a reaction between two gases. The term react in this context includes the process of combustion, and the employment of fluidised beds in furnaces has been proposed.

Known fluidised bed furnaces, and indeed other forms of fluidised bed apparatus, are subject to limitations in the relationship between the amount of material in the bed and the flow rate of fluidising gas. If the flow rate is too low, the bed does not fluidise, and if the flow rate is too high, the bed material goes into suspension and the bed breaks up. Moreover, as the flow rate increases, so does the tendency for the bed to lose homogeneity, with large bubbles or pockets of gas forming therein. In fluidised bed furnaces in particular, the amount of gas, in this case air, usable for fluidisation tends to be insufficient to ensure rapid and complete combustion of material fed into the bed.

The object of the present invention is to provide fluidised bed apparatus which enables a particulate solid material and a gas to be intimately contacted whilst using a greater proportion of gas to solids than is practicable in a conventional fluidised bed.

It should be understood that the solid content of the bed may have two components, a readily fluidisable and normally inert material and the material to be treated by contact with the gas. For example, the solid material in the bed might be sand, which is readily fluidised, into which comminuted refuse to be incinerated is introduced.

According to the invention in its broadest aspect, fluidised bed apparatus comprise a chamber defining four contiguous zones, namely a fluidised zone, a defluidised zone to one side of the fluidised zone, a suspension zone to the opposite side of the fluidised zone, and a recirculation zone overlying the fluidised zone and extending between the suspension zone and the defluidised zone, the chamber being provided with a gas outlet in communication with the recirculation zone and containing (the chamber) a quantity of solid particulate fluidisable material, and a source of pressurised gas, said source of pressurised gas being in communication with the chamber through a distributor plate situated in the wall of the chamber beneath the fluidisation zone and permitting passage of sufficient gas into that zone to fluidise the particulate material in that zone, and a gas inlet into said chamber adjacent the upper end of the suspension zone and configured to direct the incoming gas into the recirculation zone forwards and defluidised zone. Preferably the apparatus includes a second distributor plate situated in the wall of the chamber adjacent the lower end of the suspension zone and permitting passage of sufficient gas to put into suspension the particulate material in the suspension zone.

With this arrangement various advantages accrue. Although the quantity of gas which can be admitted to the fluidising zone without causing full suspension of the fluidised bed is limited, extra gas may be admitted to the suspension zone, in which whatever process the apparatus is being used to carry out may be carried further, and the suspended material then enters the recirculation zone through which it recirculates, with intense agitation, to the defluidised zone, across the top of the fluidisation zone, forming a blanket of recirculating material which helps maintain the stability of the fluidised bed in the fluidised zone even with high air flow rates. Fluidised material flowing from the fluidisation zone into the suspension zone is replaced by defluidised material recirculating from the defluidised zone. Moreover, bubbles or voids tending to form in the fluidised zone are broken up by solid material falling into the zone from the recirculation and defluidised zones.

In practice, it will normally be necessary for solid material to be introduced into and drawn off from the chamber, and the apparatus will then include means to introduce and remove solid material into and from the chamber.

The invention extends to a method of operating fluidised bed apparatus comprising causing solid particulate fluidisable material to recirulate successively through a fluidised zone, a suspended zone, a recirculation zone overlying the fluidised zone, and a defluidised zone, introducing sufficient gas in the lower end of the fluidised zone to fluidise the solid material therein, optionally introducing further gas into the lower end of the suspension zone to place in full suspension fluidised material flowing into said zone from the fluidised zone, and directing further gas into the top of the suspension zone so as to entrain suspended material therein and direct it into the recirculation zone across the top of the fluidised zone and towards the defluidisation zone so that the solid material becomes defluidised and enters the defluidised zone prior to recirculating to the fluidised zone.

Figure 2:
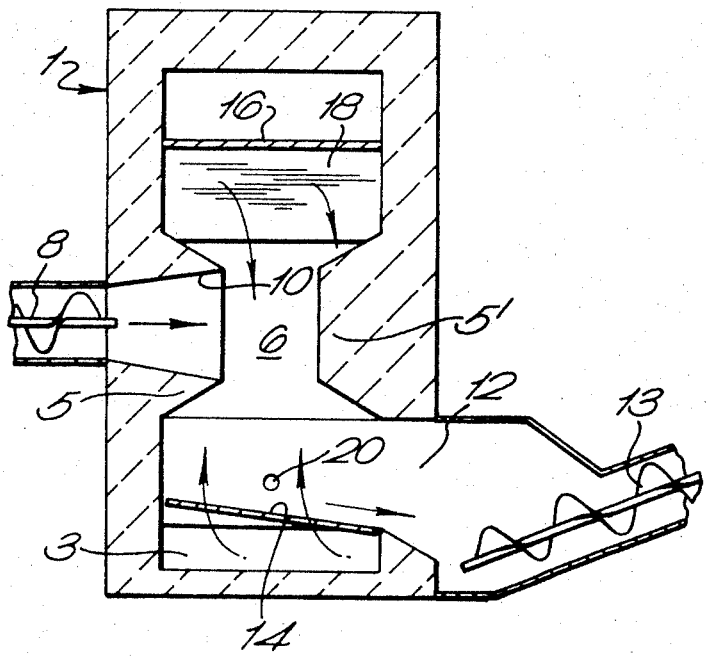
Figure 3:
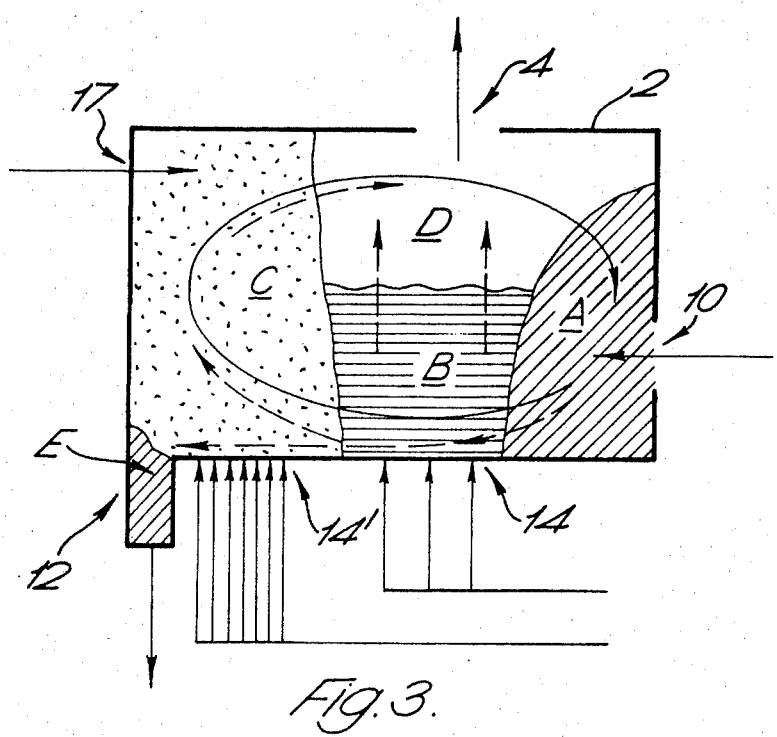

The invention will be more particularly described below with reference to a refuse incinerator, in which the refuse forms a component of the fluidisable material, reference being made to the accompanying drawings in which:

FIG. 1 is a transverse section of an incinerator constructed in accordance with the invention, FIG. 2 is a section on the line II — II in FIG. 1, FIG. 3 is a diagrammatic section through apparatus in accordance with the invention, illustrating the principle of operation.

Referring to FIGS. 1 and 2 of the drawings, the incinerator comprises an outer shell 1 having an inlet 3 for air, an outlet 4 for combustion gases, an inlet 10 for refuse, and an outlet 12 for ashes. Within the shell 1 a combustion chamber 2 is defined in part by the walls of the shell and in part by plates 14, 14', 15, 16 and 18. As clearly shown in FIG. 2, opposite side walls of the shell 1 are formed with truncated conical portions 5, 5' projecting inwardly into the combustion chamber 2 so that the combustion chamber is generally toroidal with a central zone 6 into which the refuse to be treated is introduced through the inlet 10 by means of a worm conveyor 8 after previous comminution, typically so as to pass through a 5cm. square mesh.

The comminuted refuse falls towards the bottom of the chamber 2, which is defined by the inclined perforated plate 14. The plates 14, 14' and 15 define together with the adjacent walls of the shell 1, a plenum chamber for the air entering through the inlet 3 from a pump or fan (not shown).

The plate 14 is perforated so as to permit the passage of air from the plenum chamber into the combustion chamber 2, the distribution and total area of the perforations as well as the construction of the plate being in accordance with conventional fluidised bed technology so as to produce fluidisation of solid material thereabove, this material consisting of the refuse already referred to above and a quantity of sand which in the main recirculates within the apparatus The plate 14' is also perforated, this admitting further air, which assists in placing fluidised material flowing into the zone of the combustion above and adjacent the plate 14' into full suspension. It would in fact be practicable, in certain cases where sufficient air for full combustion of the refuse supplied to the system could be supplied through the plate 14, and also through an opening 17, referred to further below, for the plate 14' to be imperforate.

The plate 15 is imperforate, and directs the remaining air from the plenum chamber into the combustion chamber through an opening 17 beneath the baffle plate 16, this opening and the baffle plate being oriented so that the air is directed across the upper part of the combustion chamber 2 beneath the baffle plate 16. A further baffle plate 18 deflects solid material entrained by the air flow downwards and assists in causing circulation of the solid material around the combustion chamber, whilst combustion gases and excess air escape through the gap between the plates 16 and 18. Only relatively light solid material will be entrained in these escaping gases, since heavier particles will fall away from the gap under the influence of gravity or will be carried past it by their own momentum. Such light dust particles can be removed from the gases by known gas cleansing plant situated in a flue connected to the outlet 4, such as a scrubber, an electrostatic precipitator, or a cyclone.

The larger lumps of ash and clinker which are less readily fluidised will tend to gravitate out of the combustion chamber 2 down the inclined plate 14' and through the outlet 12 into a hopper from whence they can be removed by an auger conveyor 13. Since the ashes from the refuse will tend to be larger than the particles of the sand contained by the combustion chamber, the ashes will be discharged from the incinerator preferentially to the sand, although there will be some loss of sand. Some of this sand can be recovered by screening the ashes removed by the conveyor 13, and this sand can be added to the refuse entering the apparatus together wich such fresh sand as may be required to make up losses. The recirculation of recovered sand also enables a portion of the heat energy contained by the material removed from the apparatus to be recycled.

In operation of such incinerator apparatus, it is found that autothermic operation may be achieved when the apparatus is fed with refuse or sewage cake having a gross calorific value of 2500 Btu/lb. Refuse of lower calorific value requires the introduction of extra fuel, conveniently by means of a jet 20 fed with liquid or gaseous fuel, which jet is also ignited initially to bring the apparatus up to a temperature at which combustion becomes self sustaining.

The mass flow rates through the plates 14 and 14' and the opening 17 are adjusted so as to provide a slight excess of air over that required for full combustion of the refuse fed into the apparatus. Although some allowance can be made for gases recirculating in the system, the mass flow rate of air through the plate 14 should be fairly close to the minimum flow rate required to fluidise the bed material, typically within ± 30 percent of this rate, whilst since this will only represent a small proportion of the total air required for combustion, some 2-6 times this mass flow rate will be passed by the plate 14' providing the bulk of the air required for combustion, the balance being admitted through the opening 17.

Proportioning of the air flow between the two plates and the opening 17 is achieved by regulating the size of the latter, and by regulatng the size and number of perforations in the plates 14 and 14'. By this means, the pressure required in the plenum chamber to achieve the desired flow rates can be minimised, allowing less sophisticated and cheaper equipment to be used to supply pressurized air to the plenum chamber through the inlet 3.

The mode of operation of the incinerator just described may be best understood by reference to the following description with reference to FIG. 3 of the drawings which shows, highly diagrammatically, a section through a generalized form of apparatus in accordance with the invention. This will in the main be described as if it were being utilized as an incinerator, with some reference to alternative modes of use.

Operation of the apparatus involves two basic processes within a single chamber which is partially filled with a bed of particles such as sand. These processes are 'fluidization' and 'full suspension' (or overfluidization) and are described further below.

For convenience the combustion chamber 2 may be considered as comprising four zones, a defluidised zone A, a fluidised zone B, a suspension zone C, and a recirculation zone D.

When the apparatus is utilized to burn comminuted municipal refuse this is fed through opening 10 into the defluidized zone A, or as in the embodiment of FIGS. 1 and 2, the zone 6 which is at the top of the fluidised zone B. When the material is fed into zone A. The defluidised bed material forms an effective seal against gases escaping from the chamber 2 via the refuse feed system. The defluidised material in Zone A also serves as a pretreatment heat soak for the refuse before it passes with the defluidised sand into the fluidised zone, B.

In zone B, the gas flow through the bed of particles is increased by the introduction of air through the perforated plate 14 beyond the rate at which the back pressure supports the weight of the bed. The bed then assumes the characteristics of a fluid. The important features of this fluidisation are:

1. relatively low gas velocities
2. high concentration of particles
3. the time of residence of particles in this zone can be prolonged
4. the intimate contact of the gases with the solids permits very rapid heat transfer
5. very high degree of aeration
6. very high degree of mechanical agitation
7. continuous breakdown of combustion boundary conditions by mobile sand particles allowing greater access by the air to the actual points of combustion.

Typically approximately one third of the total combustion air is admitted into zone B, thus combustion in this section is partial only, the products from this partial incineration being inert and combustible gases, char and recirculated ashes of completely combusted material.

The char and ashes together with the sand tend to flow into zone C where the bulk of the combustion air is introduced through the perforated plate 14'. Here the bed is in a state of full suspension of 'overfluidization.' High gas velocities are used to ensure rapid burn-out of the char and ashes. Heavy ash material from zones B and C gravitate through opening 12 to the ash discharge system which is sealed by defluidised bed material E.

The condition of full suspension leads to an upward flow of bed material in the zone C. At the top of zone C, secondary air for final burn-out of combustible gases, etc., (from zones B and C) is introduced horizontally through the opening 17. Thus bed material is caused to travel from the top of zone C through the re-circulation zone D to the top of zone A where it becomes defluidised. Material transferred from the top of zone C through zone D to zone A is made-up by bed material flowing from zone B to the base of zone C — zone B being replenished by defluidised material from the bottom of zone A. The bed thus circulates round the furnace in a vertical plane.

Zone D is contoured by a baffle plate (plate 16 in FIGS. 1 and 2) such that the tendency of the bed material is to travel horizontally beneath the outlet 4 for gases leaving the combustion chamber. This results in reduced entrainment of bed material in exhaust gases, whilst the sand content of the entrained material provides the effect of a continuously renewed porous ceramic burner immediately below the gas outlet 4. Moreover, the solid material passing through this zone provides a blanket across the top of the fluidised zone B which both enhances the stability of the latter and helps to break up any bubbles or voids in the latter.

It is found that an incinerator operating on these principles can provide very complete combustion of material introduced into the combustion chamber with only a very small excess of combustion air, with the result that the flue gases will be virtually free of carbon smoke, volatile matter, and resins and that they can be readily cleaned by conventional means, e.g. cyclones, water washing or electrostatic precipitation. Compared with modern mechanical grate incinerators, the loading on the gas cleaning plant will be nearly halved due to the low excess air requirement.

The apparatus may also be employed for the combustion of liquid and even gaseous fuels of low calorific value, which are introduced into the bed material in place of the refuse already referred to: or similar apparatus may be utilised for heat treating solid particulate material introduced into the bed which is raised to the desired temperature either by the introduction of solid, liquid or gaseous fuel or by heating the gas supplied to the apparatus. Instead of inert sand, an alternative particulate material may be utilised which either reacts with the gas utilised or a component of it, or catalyses a reaction between gases in a mixture supplied to the apparatus: in fact the apparatus and method of the invention can be utilised both to carry out most of the processes which can be carried out in a conventional fluidised bed as well as further processes for which the gas volume required in relation to the solids present is too high for conventional fluidised beds to be utilised.

What we claim is:

1. Fluidized bed apparatus comprising a chamber containing a quantity of solid particulate fluidizable material and having means constructed and arranged therewith for defining within said chamber four contiguous zones, namely a fluidized zone, a defluidized zone positioned at one side of said fluidized zone, a suspension zone positioned to the opposite side of the fluidized zone, and a re-circulation zone overlying the fluidized zone and extending between the suspension zone and defluidized zone; said means for defining said zones including a first distribution plate positioned beneath the fluidized zone, a second distribution plate adjacent the lower end of said suspension zone, said first and second distribution plates being constructed and arranged to permit passage of gas therethrough into said fluidized and suspension zones, respectively; gas inlet means in said chamber for permitting the passage of gas into the re-circulation zone of said chamber, inlet means in said chamber for the introduction of particulate solid into at least one of said zones; outlet means in said chamber for removing material from at least one of said zones, and said chamber having communication means in communication with a source of pressurized gas to be fed into said fluidized, suspension, and re-circulation zones.

2. Apparatus according to claim 1 wherein said chamber is defined within an outer shell by means of the distributor plates and further plates extending between opposite walls of the shell, including a generally horizontal baffle plate immediately above the gas inlet means configured to direct air leaving said inlet in a horizontal direction.

3. Apparatus according to claim 2 wherein said chamber is generally toroidal in form with its side walls inwardly coned to provide a narrow central zone, said inlet means for solid material being in said narrow central zone.

4. Apparatus according to claim 1 wherein said source of pressurized gas is a plenum chamber supplying air, and the size and distribution of the apertures in the said distributor plates and the inlet means are selected so as to provide a desired proportioning of air between the said various air admission means.

5. A method of operating fluidized bed apparatus which comprises causing solid particulate fluidizable material to recirculate successively through a fluidized zone, a suspended zone, a re-circulation zone overlying the fluidized zone, and a defluidized zone, including the steps of introducing sufficient gas in the lower end of the fluidized zone to fluidize solid material contained therein, admixing further gas into the lower end of a suspension zone, and directing further gas into the top of the suspension zone in an amount sufficient so as to entrain material entering the suspension zone from the fluidized zone and direct said material into the re-circulation zone across the top of the fluidized zone and towards the defluidization zone so that the solid material becomes defluidized and enters the defluidized zone prior to recirculating to the fluidized zone.

6. The method of claim 5 wherein the gas being introduced is air.

7. The method of claim 6 wherein refuse material is introduced into said solid particulate fluidized material, and the temperature of said fluidized material is raised sufficiently to consume the combustible portion of said refuse.

8. The method of claim 7 wherein the non-combustible portion of said refuse and ask is removed.

* * * * *